United States Patent [19]
Mostoller

[11] Patent Number: 5,882,253
[45] Date of Patent: Mar. 16, 1999

[54] APPARATUS AND METHOD FOR CLEANING POULTRY

[75] Inventor: Charles P. Mostoller, Langhorne, Pa.

[73] Assignee: Rhodia, Inc., Cranbury, N.J.

[21] Appl. No.: 989,273

[22] Filed: Dec. 12, 1997

[51] Int. Cl.$^6$ ................................................. A22C 17/08
[52] U.S. Cl. ................................ 452/173; 452/76; 452/77
[58] Field of Search .............................. 452/173, 74, 76, 452/77, 81

[56] References Cited

U.S. PATENT DOCUMENTS

| | | | |
|---|---|---|---|
| 2,557,335 | 6/1951 | Barker | 452/81 |
| 2,920,462 | 1/1960 | Roser et al. | 452/173 |
| 3,253,296 | 5/1966 | Brown . | |
| 3,561,040 | 2/1971 | Floden | 452/77 |
| 3,657,768 | 4/1972 | Snowden | 452/77 |
| 3,797,068 | 3/1974 | Dillon | 452/77 |
| 3,803,669 | 4/1974 | Dillon . | |
| 4,196,221 | 4/1980 | Dew . | |
| 4,337,549 | 7/1982 | Anderson et al. . | |
| 4,965,911 | 10/1990 | Davey | 452/173 |
| 5,178,579 | 1/1993 | Simmons | 452/173 |
| 5,484,332 | 1/1996 | Leech et al. | 452/173 |
| 5,651,730 | 7/1997 | McGinnis et al. | 452/74 |

FOREIGN PATENT DOCUMENTS

| | | | |
|---|---|---|---|
| 2000013 | 1/1979 | United Kingdom | 452/173 |

*Primary Examiner*—Willis Little
*Attorney, Agent, or Firm*—Dann Dorfman Herrell & Skillman, P.C.

[57] ABSTRACT

An apparatus used for reducing the amount of pathogenic bacteria associated with a bird or other edible animal, and preferably chickens, comprising: (a) a unit having an interior portion having side and bottom walls, an exterior portion having side and bottom walls and end walls connecting said interior portion to said exterior portion wherein the area of said interior portion provides a space which completely surrounds one or more of the birds or animals being treated; (b) one or more flood nozzles mounted within said interior portion of said unit and connected to a source of a bacteria reducing chemical solution to enable the bacteria reducing chemical solution to be applied to the entire interior of the body cavity of the bird or animal being treated; (c) one or more spray nozzles mounted within said interior portion of said unit and connected to a source of a bacteria reducing chemical solution to enable the bacteria reducing chemical solution to be applied to the entire external surfaces of the bird or animal being treated; and (d) one or more lines for connecting said one or more flood nozzles and said one or more spray nozzles to the source of the bacteria reducing chemical solution.

9 Claims, 2 Drawing Sheets

APPARATUS AND METHOD FOR CLEANING POULTRY

FIELD OF THE INVENTION

The present invention relates to a novel apparatus and method for washing poultry to minimize the risk of contamination to humans. More specifically, the invention comprises utilizing a novel space efficient apparatus to adequately treat an eviscerated bird by applying streams of a treating chemical to all internal and external surfaces of the bird. In a preferred embodiment, the treatment chemical comprises a trialkali metal orthophosphate, and more specifically, trisodium phosphate.

BACKGROUND OF THE INVENTION

Modern poultry operations process chicken, turkey, duck or other poultry birds through an automated system of slaughter, evisceration, cleaning and packaging. Due to its very nature, the process of evisceration exposes the exterior body surfaces and inner body cavities of the birds to the contents of the digestive tract. In so doing, the bird is exposed to potentially pathogenic microorganisms.

Several methods have been developed, with some regulated into use, to reduce the overall contamination rate of processed poultry. Among these are co-current and counter-current chill tank systems and the addition of various processing aids to these tanks. Current regulations require that each processed bird pass through a chilled water system to reduce its carcass temperature from ambient to 35° F. Several systems are employed to accomplish this.

Generally accepted methodologies utilize mechanical paddles or spirals to submerge and move the bird through the chilling bath. Regulations do not stipulate whether the water flow be co-current, that is in the direction the birds are being moved, or counter-current, where the birds move against the flow. The regulation does require, however, that a makeup and overflow system be provided in the chill system sufficient enough to provide a replacement of the water at a rate not less than one gallon per bird per minute.

While these methods provide adequate cleaning of the carcass and reduce the body temperature to prolong the product's freshness, they are not particularly effective at reducing enteric pathogens. To correct this, several modifications to the chill tank operation have been proposed and evaluated. The most promising of these has been the addition of chlorine to the water supplying the chill tank. Chlorine addition rates have been evaluated from rather low levels to levels as high as 5 parts per million of free chlorine in the tank's effluent flows. While some efficacy using this method has been reported, concern exists due to the potential for the formation of chlorinated organic compounds and their subsequent effect upon ingestion.

Several methods, including competitive bacterial exclusion and the treatment of processed birds with peroxides, acids, surfactants and other compounds have been proposed. See, for example, U.S. Pat. Nos. 3,104,170; 4,683,618; and 4,770,884. Some of these methods are being evaluated and some have been eliminated due to their inherent negative effects on the birds or concern for the safety of the resulting product when ingested.

U.S. Pat. No. 4,849,237 discloses a method for sanitizing poultry carcasses in a poultry processing plant. The method involves, after scalding, defeathering, eviscerating and chilling the bird being treated, sanitizing the bird with ozonated water. The application of the ozonated water to the bird involves both immersing the external portion of the bird in a bath of ozonated water and, while immersed in the bath, subjecting the bird to jets of ozonated water directed into the body cavity of the carcass and along the outside of the carcass. This method is problematical in that it requires an additional area outside of the processing plant production line to synthesize the ozone gas and dissolve it in water prior to treatment. This is to prevent ozone from being released into the atmosphere of the work place and creating a health hazard to the employees. As a result, the costs of treating the birds are significantly increased.

Pressure to find an effective method to reduce the likelihood of food related illnesses has been increasing with continued pressure being seen from both the public and the media. Commonly assigned U.S. Pat. No. 5,069,922 teaches a process for treating poultry carcasses to control salmonellae growth. More specifically, this method comprises treating the poultry with a treatment solution having a pH above about 11.5 and containing a trialkali metal orthophosphate.

To utilize this process on a commercial scale, a long tank is fabricated to allow the plant's overhead monorails to pull the birds through a bath containing the treatment solution. While this method is very successful, it requires large volumes of the trialkali metal orthophosphate to be used and requires a large physical area in a poultry treating plant to accommodate the tank for practical operation.

Accordingly, there exists a need in the art for a method for treating poultry (or other edible animals) to significantly reduce the amounts of potentially pathogenic bacteria of the enteric groups while providing a method which is commercially viable on a plant scale.

SUMMARY OF THE INVENTION

In light of the foregoing, the present invention includes an apparatus for cleaning eviscerated birds. The apparatus includes a conveyor for conveying the birds. A plurality of spray nozzles spray the exterior surface of the bird with cleaning fluid. A flood nozzle having a single discharge orifice provides a substantially non-diffused stream of cleaning fluid directed toward the upper opening of the bird to fill the bid with cleaning fluid as the conveyor conveys the bird.

In addition, the present invention provides a method for cleaning eviscerated birds. The method includes the steps of providing an enclosure and conveying the birds through the enclosure along an overhead track. The exterior surface of the birds are sprayed with cleaning fluid and the interior cavity of each bird is filled with cleaning fluid as the birds are conveyed through the enclosure.

BRIEF DESCRIPTION OF THE DRAWINGS

The foregoing summary, as well as the following detailed description of the preferred embodiments of the present invention, will be better understood when read in conjunction with the appended drawings, in which.

DETAILED DESCRIPTION OF THE PREFERRED EMBODIMENTS

In describing the preferred embodiment, certain terminology will be utilized for the sake of clarity. Such terminology is intended to encompass the recited embodiment, as well as all technical equivalents which operate in a similar manner for a similar purpose to achieve a similar result.

DESCRIPTION OF APPARATUS

Figure 1:
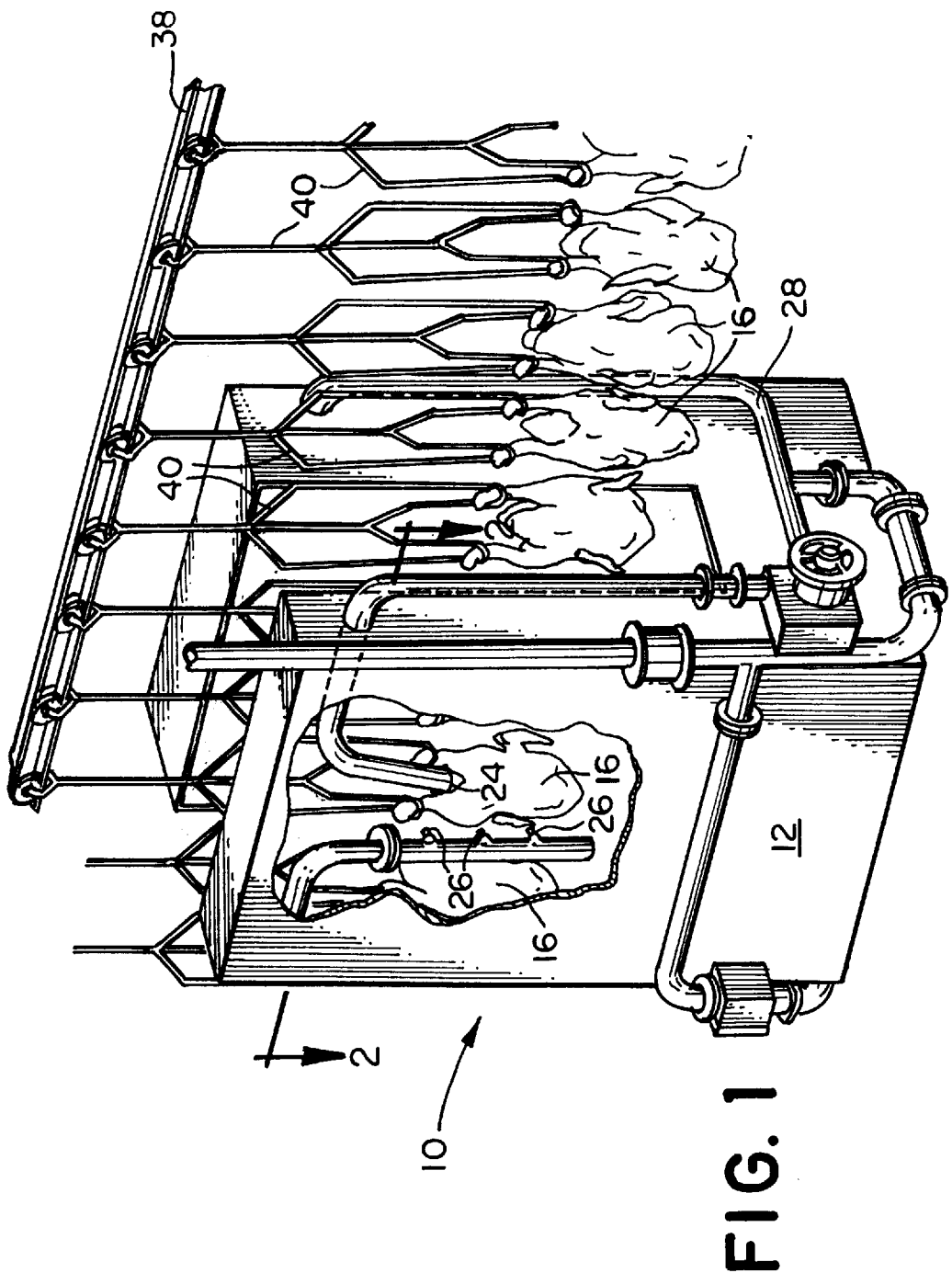
FIG. 1 is a perspective view of the apparatus of the present invention.

Referring to the drawings in general and to FIG. 1 in particular, an apparatus used to apply a bacteria reducing chemical solution to a bird or animal is shown and is represented by reference numeral 10. The apparatus includes a housing or enclosure 12 for receiving an eviscerated bird as the bird 16 is conveyed along an overhead conveyor 38. As the bird 16 travels through the enclosure 12, the interior cavity of the body is filled with cleaning fluid 42 to flush out any viscera remaining in the cavity. After the interior of the bird is cleaned, the exterior of the bird is sprayed with cleaning fluid. The housing 12 retains the cleaning fluid, so that the cleaning fluid can be reused.

Figure 2:
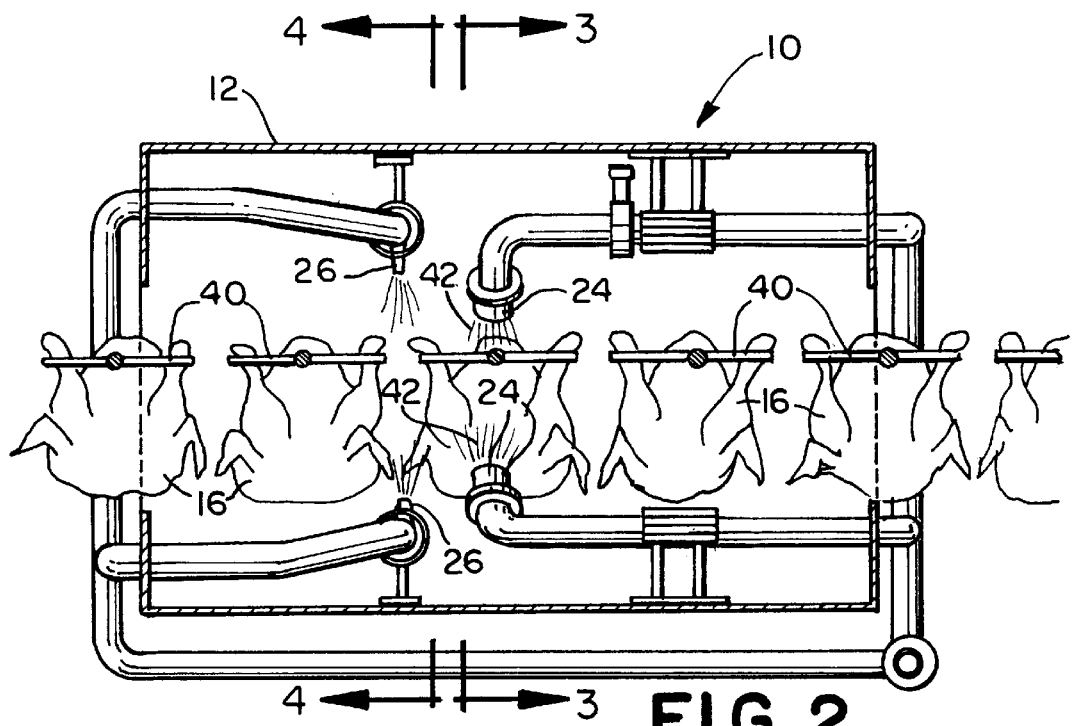
FIG. 2 is a plan view of the apparatus shown in FIG. 1.
Figures 3, 4:
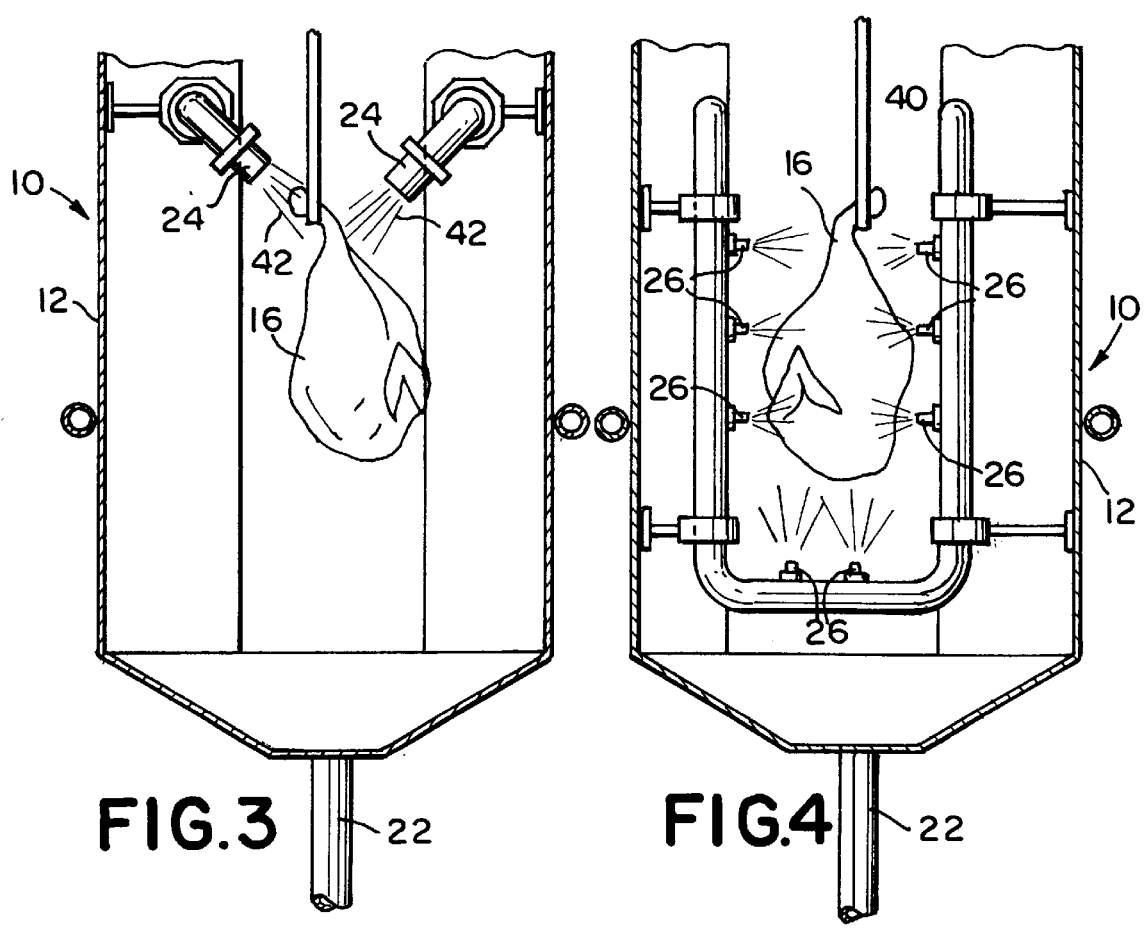
FIG. 3 is a view of the apparatus shown in FIG. 2, taken along line 3—3.
FIG. 4 is a view of the apparatus shown in FIG. 2, taken along line 4—4.

Referring to FIGS. 2–4, flood nozzles 24 and spray nozzles 26 are provided for spraying cleaning fluid. As best shown in FIG. 3, the flood nozzles 24 are located above the body of the bird which is connected to overhead conveyor 38 via shackle 40. Overhead conveyor 38 and shackle 40 are considered existing and permanently located in the plant where apparatus 10 is to be used.

In practice, the bird or animal 16 is mounted such that its tail is towards conveyor 38 and its neck is downward. The location of the flood nozzles 24 are such that a flow of bacteria reducing chemical solution 42 can be directed downwardly and entirely through the interior body cavity of the bird 16 from tail to neck.

Spray nozzles 26 are located within the enclosure such that a flow of bacteria reducing chemical solution 42 can be directed from above, at the sides and from underneath to insure application of the chemical solution to the entire exterior surfaces of the bird 16. Connected to all of these nozzles is connecting line 28. Line 28 is used to provide the bacteria reducing chemical solution to the nozzles 24 and 26.

Each of the spray nozzles 26 include a plurality of small discharge orifices to provide a dispersed or diffused spray pattern. In this way, the entire external surface of the bird is sprayed with cleaning fluid. Unlike the diffused spray pattern of the spray nozzles, each flood nozzles 24 provides a substantially unitary or non-diffused stream of cleaning fluid. The non-diffused stream of fluid facilitates filling the cavity of the bird with cleaning fluid.

A recirculation unit for servicing apparatus 10 is provided. The recirculation unit includes a tank which holds the bacteria reducing chemical solution 42. Provided within the tank is a screen which functions to exclude solid particles so that they are not circulated through apparatus 10. The screen may alternatively be installed at the suction of the pump. The screen may be sized such that it extends above the liquid level in the tank and can be fitted with a handle. When installed in this manner, the screen can be slid up and out of the tank for periodic cleaning. Connected to the tank through a line is a pump which pumps bacteria reducing chemical solution 42 through line 28 into nozzles 24 and 26.

USE OF APPARATUS TO REDUCE BACTERIA

As an example, referring to FIGS. 1–4, use of the present invention to apply a solution of a trialkali metal orthophosphate, and preferably trisodium phosphate to a chicken will be described.

Prior to the application of solution 42 to chicken 16, the solution is prepared in accordance with the method as set forth in U.S. Pat. No. 5,069,922. To the extent necessary, this patent is hereby incorporated by reference. More specifically, in the tank, 4 to 12 parts of trisodium phosphate are added and mixed in with 88 to 96 parts of water to produce a solution which contains between about 4% and about 12% trisodium phosphate by total weight of solution.

To adjust the pH to a preferred level of above 11.5, and more preferably to between about 11.6 and about 13.0, minor amounts of other agents such as sodium carbonate, sodium and/or potassium hydroxide, alkali metal polyphosphates such as sodium tripolyphosphate or acids such as phosphoric acid may be added. By "minor amounts" is meant less than 50% by weight of the combined dry weight of the trialkali metal orthophosphate and the basic agent. The temperature of the solution is maintained at between about 10° F. and about 50° F.

While the bacteria reducing chemical solution is being prepared, a chicken 16 is placed onto existing shackle 40 which is permanently attached to existing overhead conveyor 38. Chicken 16 is then subjected to typical treatments such as slaughtering, scalding, defeathering, eviscerating and the like. These procedures are not considered part of the present invention.

Chicken 16 is advanced on shackle 40 by conveyor 38 and guided by a guide until it is inside unit 10 and surrounded by the enclosure. In practice chicken 16 is advanced by conveyor 38 at a rate of about 1 ft/sec. The pump is then activated to supply line 28 with trisodium phosphate solution 42 from the tank. Prior to entering into the pump, solution 42 is filtered via the screen to exclude large particulates. The solution 42 then flows from line 28 into nozzles 24 and 26. The temperature of solution 42 is preferably between 45° F. and about 55° F.

Solution 42 is then applied through nozzles 24 and 26 to completely treat all internal and external surfaces of chicken 16. To treat the internal surfaces, particularly the body cavity of chicken 16, flood nozzle 24 is designed so that a high volume of solution 42 is directed into the body cavity of chicken 16 from tail to neck. Specifically, the flood nozzles provide a non-diffused stream of cleaning solution 42 directed at the vent opening of the bird. Nozzles 24 are "high volume/low pressure" type nozzles that operates by delivering a volume of between about 0.5 and about 1.0 gallon of solution 42 per second at a pressure of about 5 to about 10 psi. In this way, the internal cavity of the bird is filled with cleaning fluid while the bird is being conveyed through the enclosure 12.

Similarly, solution 42 is applied through spray nozzles 26 to completely coat the external surfaces of chicken 16. These nozzles 26 are positioned to direct solution 42 from above, at the sides and to the under sides of chicken 16. Nozzles 26 are constructed so that they provide the widest full cone or flat spray angles and are of wide bore design. Examples of such nozzles include those manufactured by Spray Systems, Inc.

Chicken 16 is thereafter advanced through unit 10 by conveyor 38 where it may be identically treated by one or more series of nozzles. In addition, a single flood nozzle instead of two can be used to fill the cavity of the bird. However, the cleaning solution flow rate may need to be adjusted to ensure that the cavity is filled.

To provide additional protection against bacteria, it is desired that an amount of solution 42 remain on the exterior and internal surfaces of the chicken. As a result, the chickens do not undergo an additional rinse treatment after treatment with solution 42.

While chickens 16 are being sprayed, excess solution 42 and other miscellaneous solids, not pictured, such as loosened chicken parts fall downwardly inside surface 14 via gravity to the bottom of the enclosure 12. These components are transported through an exit port and line 22 back into the tank where they are recycled for future use. As discussed above, the screen isolates the solids from the solution so that the solution can be reused in treating other chickens advanced by conveyor 38.

CONSTRUCTION MATERIALS

Unit 10 may be constructed of any approved materials (particularly USDA approved materials) such as stainless steel or USDA approved thermoplastics. Particularly preferred is 10 to 20 gauge stainless steel. For use to treat a chicken, the approximate size of unit 10 is about 3 to 4 feet in height, 3 to 4 feet in width and about 3 feet in length. Larger sizes may be selected if the animal being treated is larger (e.g., pork, beef, lamb, game, etc.).

Similarly, unit 50 may be constructed of any approved materials (particularly USDA approved materials) such as stainless steel or USDA approved thermoplastics. Particularly preferred is 10 to 20 gauge stainless steel. Typical pump sizing provides for up to 100 gallons per minute with heads of up to 30 to 40 feet. The size of the tank is dependent on the mode of plant operation and can range in size from as little as 50 gallons to as high as 500 gallons. Again, as will be recognized, larger sizes may be utilized for larger animals to be treated.

It will be recognized by those skilled in the art that changes or modifications can be made to the above-described embodiments without department from the broad inventive concept of the invention. It should therefore be understood that this invention is not limited to the particular embodiments described herein but is intended to include all changes and modifications that are within the scope and spirit of the invention as set forth in the following claims.

That which is claimed is:

1. An apparatus for cleaning an eviscerated bird having an upper opening communicating with an internal cavity and a lower opening, comprising:

a conveyor for conveying the bird;

a cleaning fluid supply;

a plurality of spray nozzles communicating with the cleaning fluid supply for spraying the cleaning fluid on the exterior surface of the bird; and a flood nozzle communicating with the cleaning fluid supply, wherein the nozzle has only a single orifice so that the flood nozzle provides a generally non-diffused stream of cleaning fluid directed toward the upper opening of the bird to fill the bird with cleaning fluid as the conveyor conveys the bird, wherein the flood nozzle is pivotally mounted so that the direction of the stream is adjustable, and the flow rate of the cleaning fluid through the flood nozzle is at least approximately 25 gallons per minute.

2. An apparatus for cleaning an eviscerated bird having an upper opening communicating with an internal cavity and a lower opening, comprising:

a cleaning fluid supply;

a plurality of spray nozzles communicating with the cleaning fluid supply wherein each spray nozzle has a plurality of outlet orifices for spraying the cleaning fluid on the exterior surface of the bird; and a flood nozzle communicating with the cleaning fluid supply wherein the flood nozzle has fewer orifices than at least one of the spray nozzles, so that the flood nozzle provides a generally non-diffused stream of cleaning fluid directed toward the upper opening of the bird to fill the bird cavity with cleaning fluid.

3. The apparatus of claim 2 wherein the flood nozzle has only a single orifice.

4. The apparatus of claim 2 wherein the flood nozzle provides a non-diffused stream of cleaning fluid at a flow rate of at least approximately 25 gallons per minute.

5. The apparatus of claim 2 comprising a second flood nozzle communicating with the cleaning fluid supply wherein the flood nozzle has fewer orifices than one of the spray nozzles, so that the second flood nozzle provides a generally non-diffused stream of cleaning fluid directed toward the upper opening of the bird.

6. The apparatus of claim 2 wherein the flood nozzle is pivotably mounted so that the direction of the stream is adjustable.

7. A method for cleaning eviscerated birds having an upper opening and an internal cavity, comprising the steps of:

providing an enclosure;

conveying the birds through the enclosure along an overhead track;

spraying the exterior surface of the birds with cleaning fluid;

filling the interior cavity of each bird with cleaning fluid as the birds are conveyed through the enclosure.

8. The method of claim 7 comprising the step of directing a substantially non-diffused stream of cleaning fluid toward the upper opening to fill the interior cavity.

9. The method of claim 8 wherein the stream of cleaning fluid has a flow rate of at least approximately 25 gallons per minute.

* * * * *